United States Patent [19]
Will

[11] Patent Number: 6,105,983
[45] Date of Patent: Aug. 22, 2000

[54] STEERING MECHANISM FOR OFF-ROAD VEHICLES

[76] Inventor: Dale D. Will, 10750 May Rd., Wattsburg, Pa. 16442-9602

[21] Appl. No.: 09/238,037

[22] Filed: Jan. 27, 1999

[51] Int. Cl.[7] .................................................... B60G 7/00
[52] U.S. Cl. ................................ 280/93.514; 280/93.513
[58] Field of Search ....................... 280/93.513, 93.514; 180/428, 430

[56] References Cited

U.S. PATENT DOCUMENTS

| | | | |
|---|---|---|---|
| 4,367,881 | 1/1983 | Williams | 280/96 |
| 4,441,735 | 4/1984 | Hutchison et al. | 280/771 |
| 4,659,106 | 4/1987 | Fujita et al. | 280/772 |

Primary Examiner—Christopher P. Ellis
Assistant Examiner—Faye M. Fleming
Attorney, Agent, or Firm—Richard K. Thomson

[57] ABSTRACT

A steering mechanism includes a flexible drive element configured as a segment of drive belt which engages the toothed drive pulley attached to the lower end of a steering post. The ends of the belt segment art attached to a drag link which translates rotational oscillatory motion imparted by the steering wheel or handlebars into linear lateral oscillatory motion. Each end of the drag link is attached to a lever arm of its respective spindle by a connecting linkage which translates the linear lateral oscillatory motion back into rotary oscillation of the spindles and their attached steered elements. The steering mechanism is located above the power unit of the vehicle so it is more easily serviced. Further, the reduction in the number of parts and wear points reduces the need for servicing of the steering mechanism.

11 Claims, 4 Drawing Sheets

ND SUMMARY OF THE
STEERING MECHANISM FOR OFF-ROAD VEHICLES

BACKGROUND AND SUMMARY OF THE INVENTION

This invention is directed to a steering mechanism primarily for lightweight, off-road vehicles such as snowmobiles, all terrain vehicles and lawn tractors.

Motorized off-road vehicles generally include a frame or chassis, two steerable skis or wheels at the front, a motor mounted in the front portion of the chassis, and an endless track or wheels attached to the rear portion of the chassis driven by the motor to propel the vehicle. Typical prior art steering mechanisms include handlebars or a steering wheel mounted atop a steering post with a transfer arm attached to the lower end of the post. The steering post is rotatably attached to the chassis at one or more points and typically extends underneath the motor. Movement of the steering post is transmitted to a steering arm by means of a transfer arm. The transfer arm typically takes the form of a threaded tube with a pivoting joint at each end, a rack and pinion assembly, or a steering box that encloses gears. The steering arm is usually attached to a drag link that is, in turn, pivotally attached to the chassis using an idler arm. The drag link then transfers motion to a pair of tie rod tubes fitted with a tie rod on each end. The tie rod tubes are attached to a pair of spindles, which support the wheels or skis and transfer the steering motion from the handlebars or steering wheel.

One obvious disadvantage of a conventional steering system is the large number of individual component parts and pivot points utilized, adding weight and expense to the steering system. Each of these parts is subject to wear, some parts wearing quite quickly, creating an undesirable amount of free play in the handlebars which can result in binding of the entire steering mechanism. Furthermore, many of these component parts are located beneath the motor which has two disadvantages. First, this configuration requires the motor to be mounted high on the chassis, producing a high center of gravity and a vehicle with poor ergonomics necessitating a high cowl which has poor aerodynamics. Second, removal of the motor is typically required to service the steering via repair or replacement of many of these parts.

A second disadvantage of this steering system is the inability to selectively change the steering ratio (defined as the functional relationship between the steering angle of the handlebars or steering wheel and the turning radius of the vehicle) to achieve the "optimum feel" desired by a particular driver for a particular circumstance. For example, on a vehicle used for racing on a short course with sharp turns, less movement of the handlebars would be desirable to achieve the desired turning radius compared to a vehicle used to travel longer distances over extended periods of time, which would perform better using a lower ratio providing more leverage in the handlebars for the operator.

A third disadvantage to the conventional steering system occurs when the steerable ski or wheel encounters a rock or tree or other impediment. Such an impact generally results in one or more parts fracturing or bending rendering the vehicle unusable. Due to the location of many of these parts beneath the motor, repair/replacement is not easily effected in the field and the vehicle must frequently be transported to a garage for repair requiring that the engine be pulled to provide access to the damaged part. Deep snow, mud and rugged terrain, combined with the size and weight of the vehicle can make this a very difficult and unpleasant task.

Yet a fourth disadvantage of this steering system lies in its rigidity. The vibrations experienced by the skis or wheels are transmitted through the system to the handlebars/steering wheel into the steerer's hands and arms producing fatigue. Long term, continuous exposure to such vibrations can result in nerve damage and a condition known as "white hand".

These disadvantages of the conventional steering system for off-road vehicles are exacerbated by the increasing capabilities of the drive systems (size and power of the engine) and the rigorous use to which the vehicles are put (i.e., racing). In an attempt to satisfy the demands of the consumer, manufacturers are producing faster, more powerful machines than ever before. These more powerful vehicles when used in the more rigorous conditions associated with racing, are over-driving the capabilities of the steering systems and accelerating failures due to wear and breakage.

All of these disadvantages are addressed by the steering mechanism of the present invention. A steering post is rotatably attached to a chassis. The steering post may be operated by a set of handle bars or a steering wheel affixed to its upper end. To the lower end of the steering post is attached a drive pulley which engages a segment of a drive belt. The two ends of the drive belt are attached to ends of a drag link by two retainers. Tension in the belt is maintained by a pair of idler rollers which may be manually or automatically (spring-biased) adjusted to provide proper tension in the belt.

The drag link is itself pivotally attached to the chassis by a pair of idler arms to permit the drag link to slide laterally to the left and right to steer the vehicle. Each end of the drag link is, in turn, attached to a spindle by means of heim joint, a tie rod tube and a tie rod. Each spindle is connected to either a steerable ski or wheel, depending on the nature of the off-road vehicle.

The present steering system is simple, light weight, reliable and precise. In addition, the steering ratio can be easily changed by replacing the drive pulley with another having a larger or smaller diameter. While the improved system is less prone to wear and breakage due in part to the fewer number of parts, servicing is greatly simplified since the entire mechanism is positioned above/in front of the drive train. This also provides a lower center of gravity for the vehicle, a lower profile and a more aerodynamic design. The steering mechanism is easier for the driver to operate, results in the transmission of less vibration into the driver's hands, reduces the free play of the steering mechanism and provides a more precise feel for the driver.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF PREFERRED EMBODIMENT(S)

Figure 1:
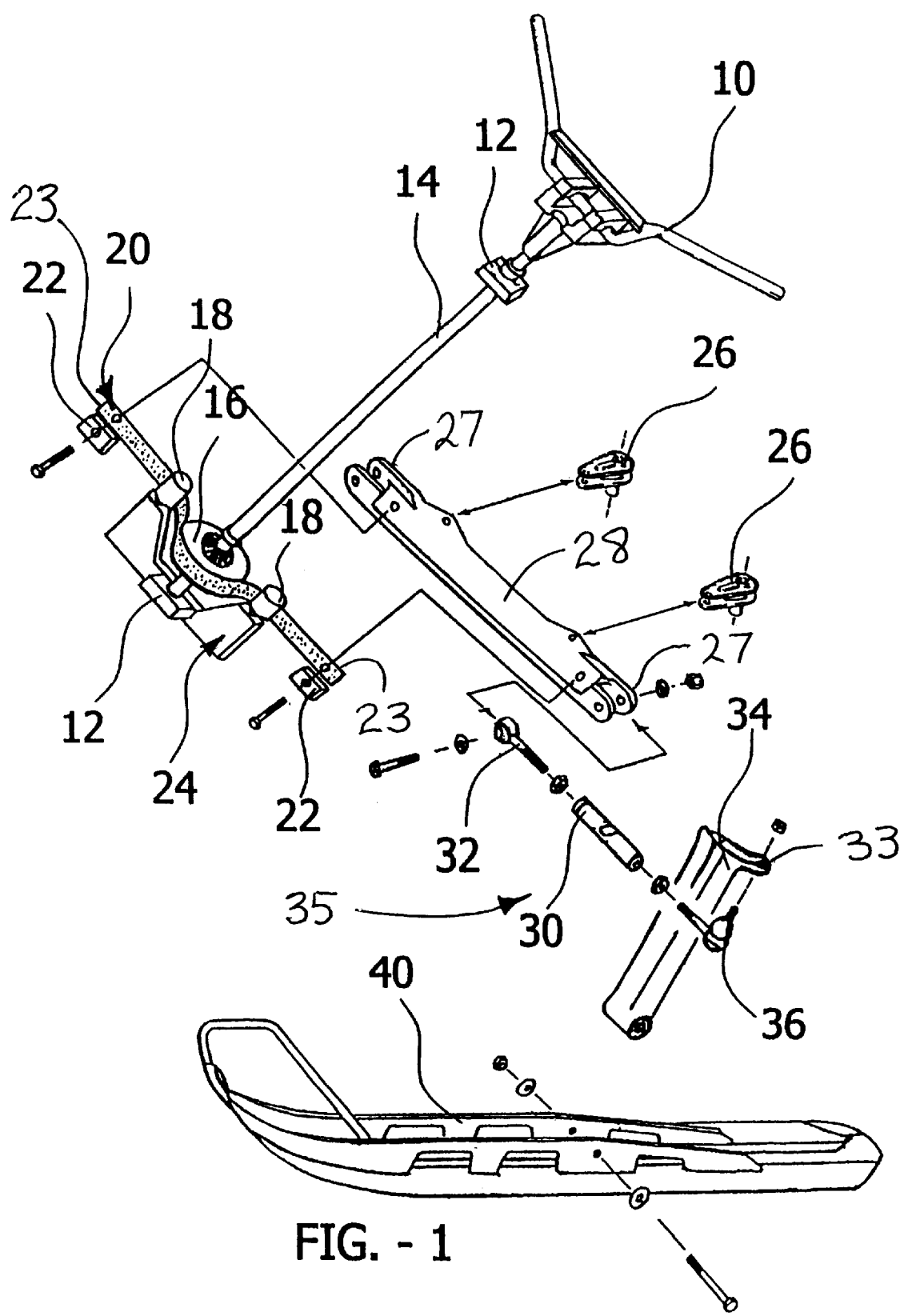
FIG. 1 is an exploded isometric view of a first embodiment of the steering mechanism of the present invention.
Figure 4:
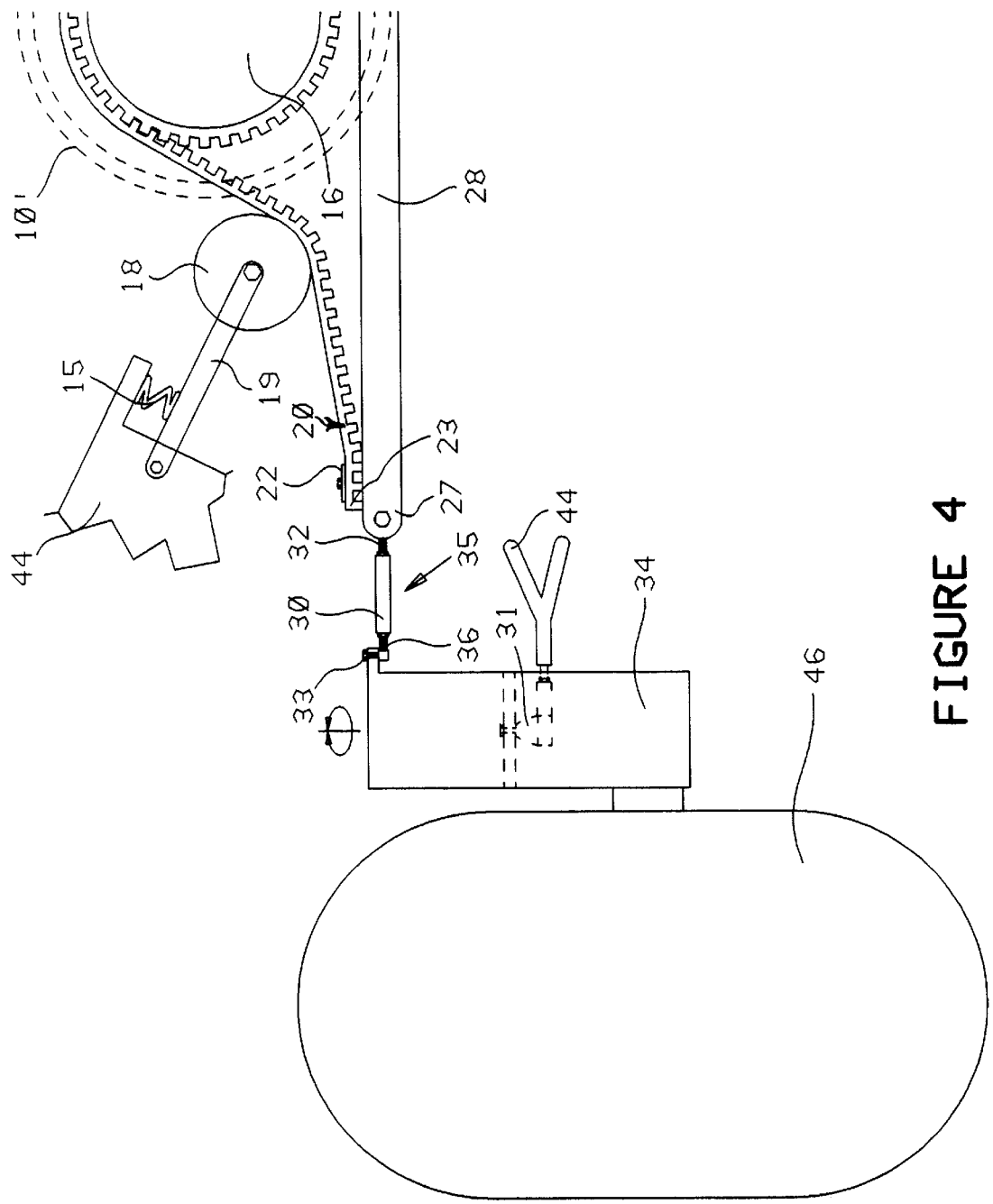
FIG. 4 is front view of the steering mechanism of the present invention assembled in a wheeled off-road vehicle.

A first preferred embodiment of the steering mechanism of the present invention is shown in FIG. 1. Steering post 14 is rotatably mounted on a chassis (not shown) by upper and lower post supports 12. Handle bars or other handheld steering device 10 is attached to the upper end of post 14. Typically, handle bars 10 will be used with steerable skis 40 and a steering wheel 10' will normally be used with steerable wheels 46 (FIG. 4).

Figure 3:
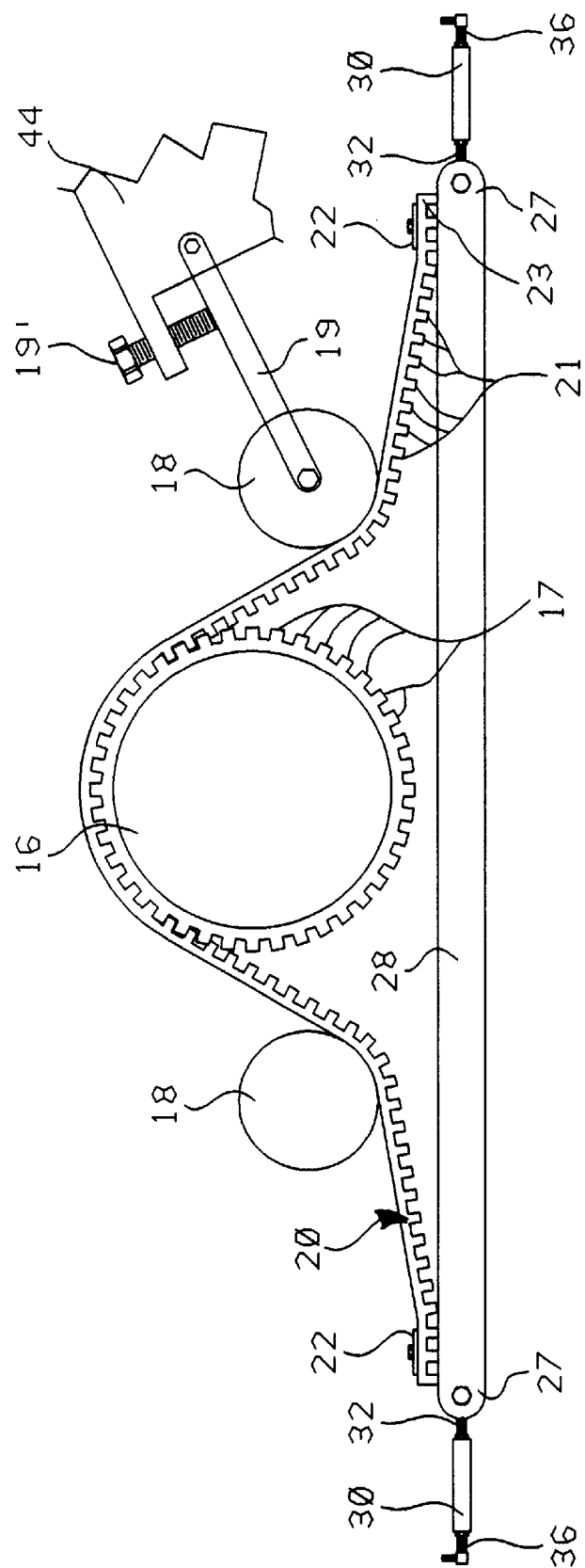
FIG. 3 is an enlarged top view of principal elements of the first embodiment or the steering system of the present invention.

As best seen in FIG. 3, a steering pulley 16 is attached near the lower end of steering post 14 by means of conventional set screws (not shown). Teeth 17 on steering pulley 16 engage teeth 21 on drive belt means which comprises a drive belt segment 20. Ends 23 of belt segment 20 are attached to ends 27 of drag link 28 by retainers 22. Proper tension is maintained in belt segment 20 by a pair of tensioning idler rollers 18. Idler rollers 18 and lower post support 12 form part of the lower support assembly 24. Idler rollers 18 mounted by brackets 19 can be manually adjusted using bolts 19' (FIG. 3) or may be automatically adjusted by springs 15 (FIG. 4) to provide the desired amount of tension in belt segment 20. Drag link 28 is pivotally mounted on chassis 44 by a pair of idler arms 26 which permit lateral back and forth motion of drag link 28.

Connection linkage 35 interconnects each end of drag link 28 to a spindle 34. Connection linkage 35 includes heim joint 32, tie rod tube 30 and tie rod 36. Heim joint 32 is pivotally bolted to drag link 28. Heim joint 32 is threaded into one end of tie rod tube 30 with tie rod 36 threaded into the opposite end of tube 30. Tie rod 36 is, in turn, attached to a lever arm 33 on spindle 34. Spindle 34 is typically attached to chassis 44 by two ball joints 31 (an upper one and a center one with only the latter being shown) and its lower end to the steered element, either ski 40 or wheel 46. This connection will normally be rigid about a vertical axis but will be pivotal about a horizontal axis parallel to the axis of the steered element 40, 46 to permit relative vertical movement. By moving lever arm 33 left or right, spindle 34 is rotated about its axis and thereby turns steered element 40 or 46. It is important that lever arm 33 extend a significant distance from the centerline of spindle 34 in order to provide an adequate moment arm to effect rotation of the spindle 34 and its steered element 40, 46 with relatively little rotational force of steering device 10.

Figure 2:
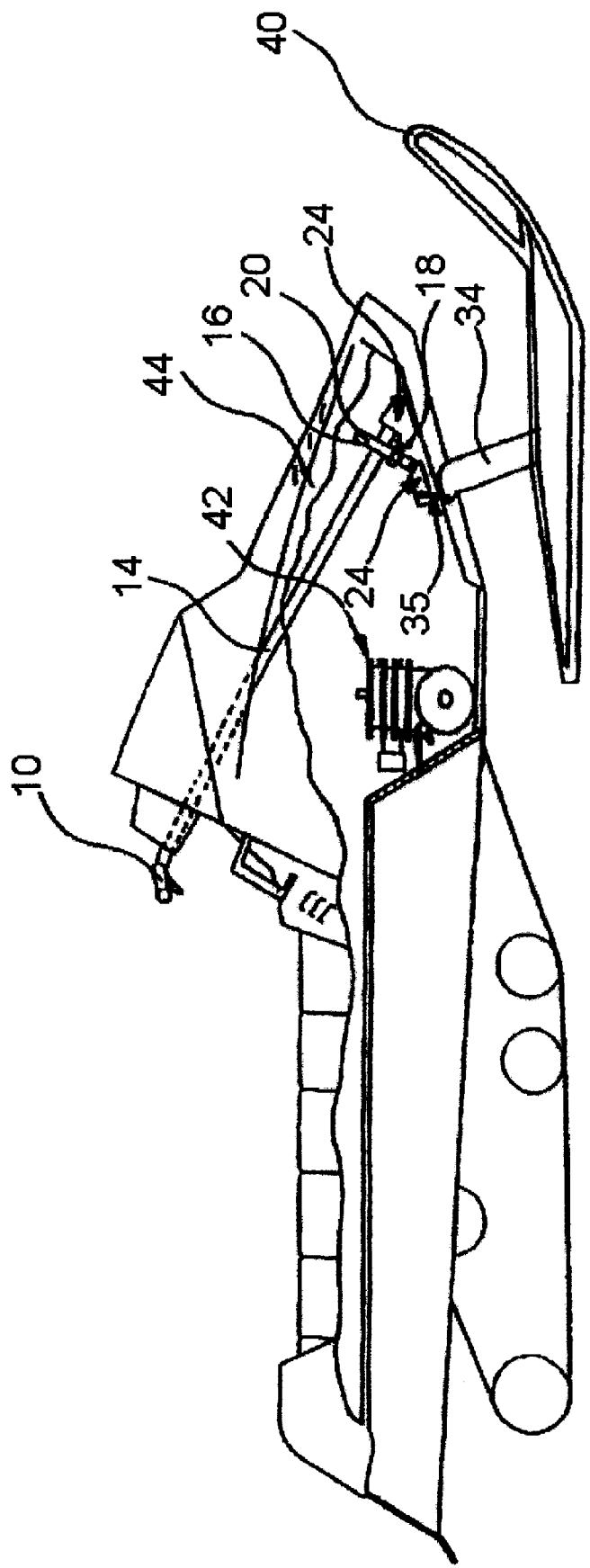
FIG. 2 is a side view of the first embodiment of the steering mechanism of the present invention assembled in a snowmobile with portions broken away.

As seen in FIG. 2, power unit assembly 42 is mounted beneath the steering post 24. This has a number of benefits. It enables the overall profile of the vehicle to be reduced improving the ergonomics of the snowmobile by lowering the center of gravity. The cowl which surrounds the chassis 44 will also have a lower profile improving aerodynamics. In addition, the entire steering assembly is above or in front of the power unit assembly 42 which enables servicing of the steering elements to easily be achieved without the need to pull the power unit assembly 42. This ease of servicing would include altering the drive ratio by changing out steering pulley 16.

When steering device 10 is rotated, post 14 rotates steering pulley 16. Teeth 17 on pulley 16 engage teeth 21 on belt segment 20 moving drag link 28 left or right (in the direction of the rotation of steering device 10). Drag link 28 converts the rotational oscillatory movement imparted by the steering device 10 to steering pulley 16 into linear lateral oscillatory motion. Connecting linkage 35 transmits the lateral movement of drag link 28 to lever arm 33, which by virtue or the pivotal connection of spindle 34 to chassis by ball joints 31, rotates spindle 34 and its steered element 40, 46. Connecting linkage's 35 movement of lever arm 33 to rotate spindle 34 and its attached steered element 40, 46 re-translates the translational oscillatory motion of drag link 28 into rotational oscillatory motion of the spindle 34 and its attachments. This steering mechanism is greatly simplified by reducing the number of pieces and wear points, can be adjusted if need be, and is more easily repaired in the field due to its accessibility.

Various changes, alternatives and modifications will become apparent to one of ordinary skill in the art following a reading of the foregoing specification. For example, the toothed belt and pulley could take the form of a chain and sprocket. It is intended that any such changes, alternatives and modifications as fall within the scope of the appended claims be considered part of the present invention.

I claim:

1. A steering mechanism for a light weight, off-road vehicle with a power unit mounted on a chassis, said steering mechanism comprising a) a steering post adapted to be rotatably mounted on the chassis;

b) a manually operable steering device mounted on a first upper end of said steering post;

c) a steering pulley attached to a second lower end of said steering post;

d) a flexible drive means interconnected to said steering pulley;

e) a drag link attached to said flexible drive means for translating a rotational oscillatory motion imparted by movement of said manually operable steering device into linear lateral oscillating motion;

f) a steered element positioned near each end of said drag link;

g) a spindle attached to each said steered element to transmit coordinated oscillatory rotational motion to each said steered element;

h) a connecting linkage interconnecting each end of said drag link to one of said spindles, said connecting linkage re-translating said linear lateral oscillatory movement of said drag link into rotational oscillatory motion of said spindle responsive to movements of said manually operable steering device.

2. The steering mechanism of claim 1 wherein said flexible drive means comprises a segment of a drive belt, said drive belt having teeth which engage teeth on said steering pulley.

3. The steering mechanism of claim 2 wherein end portions of said segment of drive belt are attached to end portions of said drag link by retainers.

4. The steering mechanism of claim 3 further comprising tensioning rollers engaging said segment of drive belt to eliminate slack.

5. The steering mechanism of claim 4 further comprising manually adjustable brackets mounting said tensioning rollers.

6. The steering mechanism of claim 4 further comprising automatic means for adjusting said tensioning rollers to eliminate slack in said segment of drive belt.

7. The steering mechanism of claim 6 wherein said automatic means for adjusting said tensioning rollers comprises coil springs for biasing said tensioning rollers into engagement with said segment of drive belt.

8. The steering mechanism of claim 1 wherein said steering post is adapted to be located above a power unit assembly of said vehicle.

9. The steering mechanism of claim 1 wherein each said connecting linkage comprises a heim joint, a tie rod tube, and a tie rod.

10. The steering mechanism of claim 1 wherein each said spindle has a lever arm of sufficient length to create a moment arm for turning said steerable element with a small amount of rotational force applied to said manually operable steering device.

11. A steering mechanism for a light weight, off-road vehicle with a power unit mounted on a chassis, said steering mechanism comprising a) a steering post adapted to be rotatably mounted on the chassis;

b) a manually operable steering device mounted on a first upper end of said steering post;

c) a toothed steering pulley attached to a second lower end of said steering post;

d) a toothed segment of flexible drive belt drivingly interconnected to said steering pulley;

e) a drag link attached to said segment of flexible drive belt for translating a rotational oscillatory motion imparted by movement of said manually operable steering device into linear lateral oscillating motion;

f) a steered element positioned near each end of said drag link;

g) a spindle attached to each said steered element to transmit coordinated oscillatory rotational motion to each said steered element;

h) a connecting linkage interconnecting each end of said drag link to one of said spindles, said connecting linkage re-translating said linear lateral oscillatory movement of said drag link into rotational oscillatory motion of said spindle and its connected steered element responsive to movements of said manually operable steering device.

* * * * *